US012572302B2

(12) United States Patent
He et al.

(10) Patent No.: US 12,572,302 B2
(45) Date of Patent: Mar. 10, 2026

(54) PARTITIONED TRANSFERRING FOR WRITE BOOSTER

(71) Applicant: Micron Technology, Inc., Boise, ID (US)

(72) Inventors: Deping He, Boise, ID (US); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/540,448

(22) Filed: Dec. 14, 2023

(65) Prior Publication Data

US 2024/0241665 A1 Jul. 18, 2024

Related U.S. Application Data

(60) Provisional application No. 63/479,925, filed on Jan. 13, 2023.

(51) Int. Cl.
G06F 3/06 (2006.01)

(52) U.S. Cl.
CPC .......... G06F 3/0656 (2013.01); G06F 3/0604 (2013.01); G06F 3/0679 (2013.01)

(58) Field of Classification Search
CPC .... G06F 3/0656; G06F 3/0604; G06F 3/0679; G06F 3/061; G06F 3/0659
See application file for complete search history.

(56) References Cited

U.S. PATENT DOCUMENTS

| | | | |
|---|---|---|---|
| 10,331,555 B1 * | 6/2019 | Muthiah | G06F 3/0656 |
| 2019/0179567 A1 * | 6/2019 | Kanno | G06F 3/064 |
| 2022/0004495 A1 * | 1/2022 | Natarajan | G06F 12/123 |
| 2022/0221997 A1 * | 7/2022 | Navon | G06F 3/0673 |
| 2022/0253239 A1 * | 8/2022 | Jang | G06F 3/0679 |
| 2022/0374172 A1 * | 11/2022 | Kim | G06F 3/0673 |
| 2023/0126807 A1 * | 4/2023 | Kim | G06F 12/0246 |
| | | | 711/163 |
| 2023/0147477 A1 * | 5/2023 | Kim | G06F 3/061 |
| | | | 711/154 |
| 2023/0154529 A1 * | 5/2023 | Shin | G11C 16/08 |
| | | | 365/185.03 |
| 2023/0305745 A1 * | 9/2023 | Horspool | G06F 3/064 |
| 2024/0168886 A1 * | 5/2024 | Zhang | G11C 11/5628 |
| 2024/0264751 A1 * | 8/2024 | Li | G06F 12/02 |
| 2024/0311018 A1 * | 9/2024 | Cho | G06F 3/0619 |
| 2024/0338136 A1 * | 10/2024 | Kim | G06F 3/0604 |

* cited by examiner

*Primary Examiner* — Edward J Dudek, Jr.
(74) *Attorney, Agent, or Firm* — Holland & Hart LLP

(57) ABSTRACT

Methods, systems, and devices for partitioned transferring for write booster are described. Techniques are described for a memory system to transfer data from a buffer associated with a write booster mode to higher-density blocks of the memory system based on a type of the data stored in the buffer. A first type of data may be transferred from the buffer to the higher-density blocks before a second type of data may be transferred from the buffer to the higher-density blocks. Prioritizing the transfer of data from the buffer to the higher-density block based on the type of data may reduce a write amplification associated with the memory system.

16 Claims, 6 Drawing Sheets

Hot data 250
Warm data 255
Cold data 260
Empty 265
205
Host System
Buffer 215
230
Memory System 210
Higher-Density Blocks 220
235-a
235-b
280
200-c

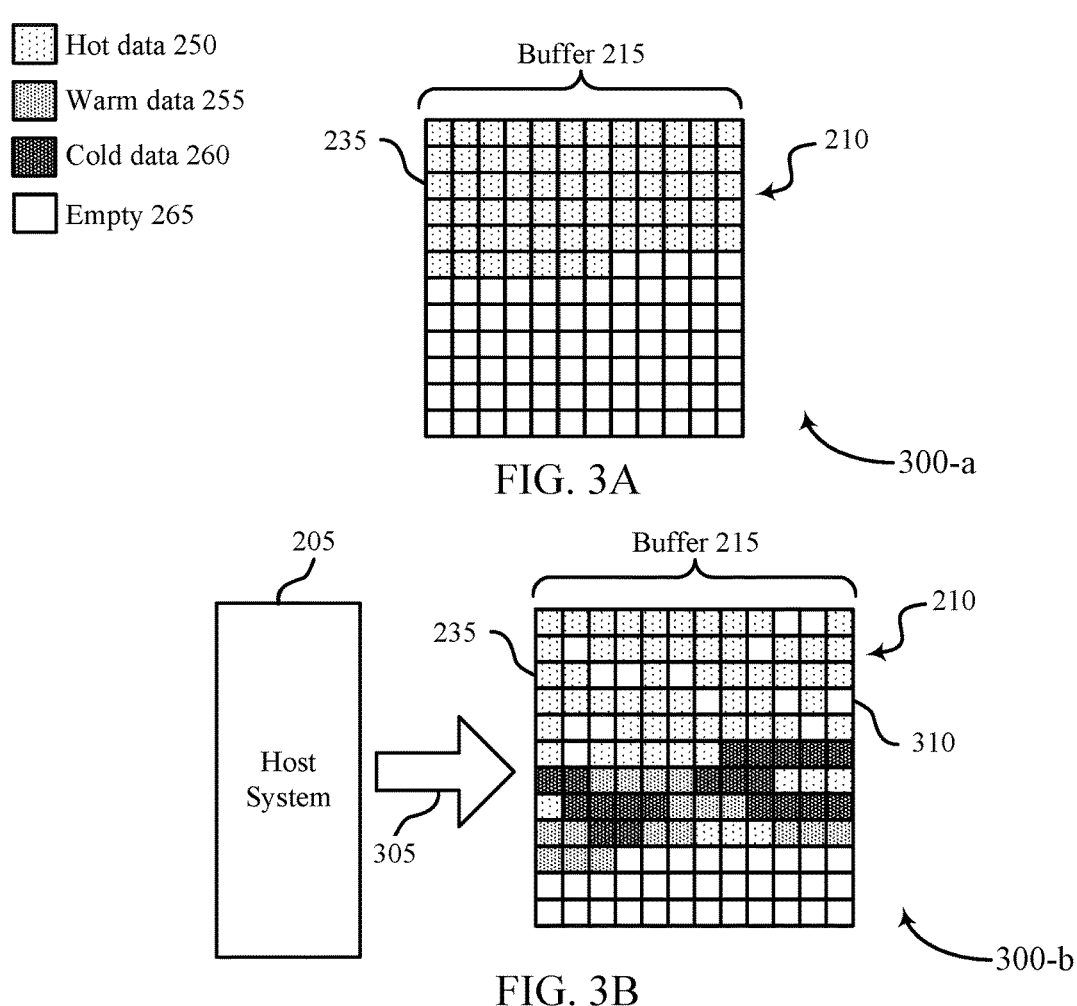
FIG. 3A
FIG. 3B
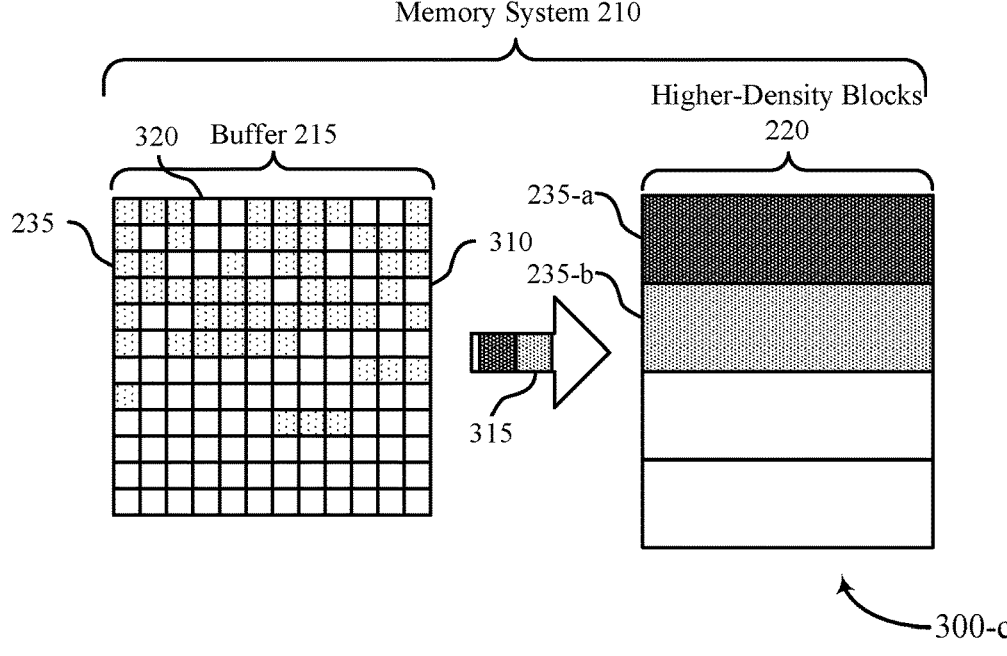
FIG. 3C

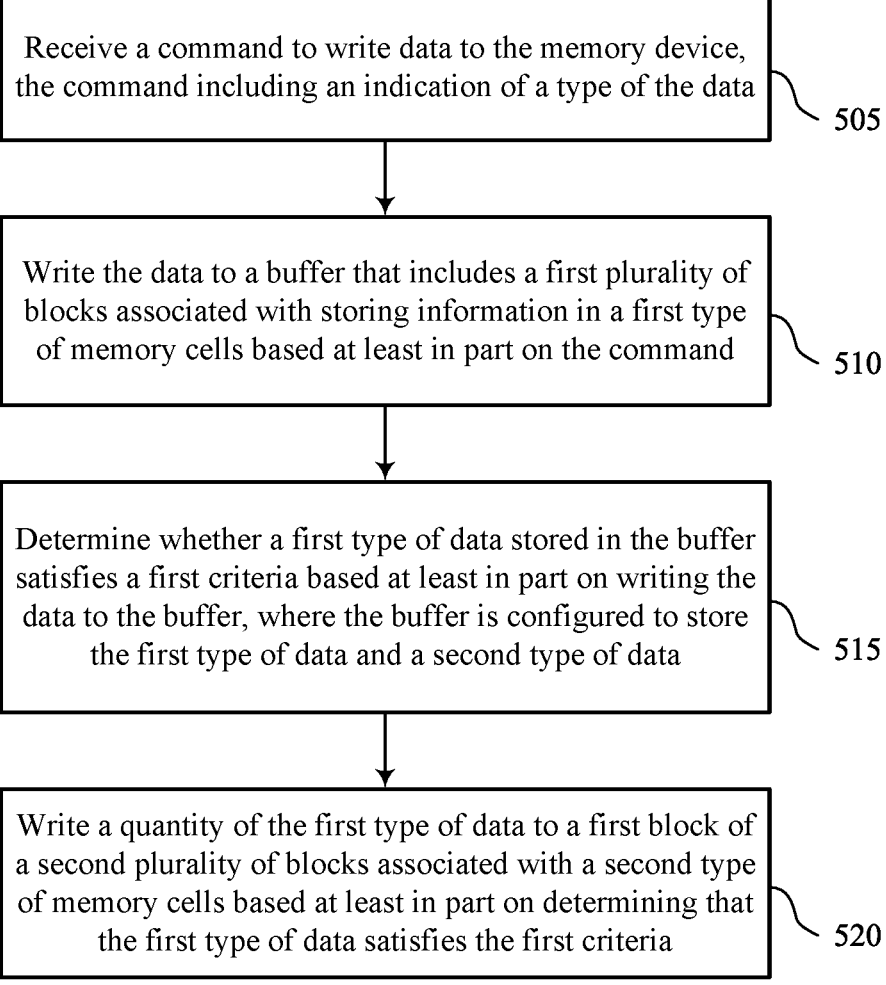

Receive a command to write data to the memory device, the command including an indication of a type of the data

505

Write the data to a buffer that includes a first plurality of blocks associated with storing information in a first type of memory cells based at least in part on the command

510

Determine whether a first type of data stored in the buffer satisfies a first criteria based at least in part on writing the data to the buffer, where the buffer is configured to store the first type of data and a second type of data

515

Write a quantity of the first type of data to a first block of a second plurality of blocks associated with a second type of memory cells based at least in part on determining that the first type of data satisfies the first criteria

PARTITIONED TRANSFERRING FOR WRITE BOOSTER

CROSS REFERENCE

The present application for patent claims the benefit of U.S. Provisional Patent Application No. 63/479,925 by H E et al., entitled "PARTITIONED TRANSFERRING FOR WRITE BOOSTER," filed Jan. 13, 2023, assigned to the assignee hereof, and expressly incorporated by reference herein.

TECHNICAL FIELD

The following relates to one or more systems for memory, including partitioned transferring for write booster.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

BRIEF DESCRIPTION OF THE DRAWINGS

FIGS. 3A, 3B, and 3C, illustrate examples of data flow diagrams that support partitioned transferring for write booster in accordance with examples as disclosed herein.

FIG. 5 illustrates a flowchart showing a method or methods that support partitioned transferring for write booster in accordance with examples as disclosed herein.

DETAILED DESCRIPTION

Operating in a write booster mode may enable a memory system to handle a higher volume of write commands from a host system and reduce an impact on latency performance for performing those commands by the memory system. In scenarios with nominal traffic to the memory system, the memory system may write data directly into higher-density blocks (e.g., multi-level cells, triple-level cells, or quad-level cells). Writing data directly in the higher-density blocks, however, may take more time than writing data into single-level cell blocks. In scenarios where the memory system receives a high-volume of write commands in a short duration, the memory system processing capabilities may become saturated and the latency for performing access operations (e.g., write operations and read operations) may increase. Some memory systems may include a write booster mode to improve performance during such scenarios.

As the buffer associated with the write booster mode becomes more full, the memory system may transfer the data from the buffer to the higher-density blocks as background operations. Blindly transferring the data out of the buffer into the higher-density blocks may increase a likelihood of garbage collection operations occurring at the higher-density blocks that store the transferred data.

Techniques are described for a memory system to transfer data from a buffer associated with a write booster mode to higher-density blocks of the memory system based on a type of the data stored in the buffer. A first type of data may be transferred from the buffer to the higher-density blocks before a second type of data may be transferred from the buffer to the higher-density blocks. Prioritizing the transfer of data from the buffer to the higher-density block based on the type of data may reduce a write amplification associated with the memory system.

Figure 1:
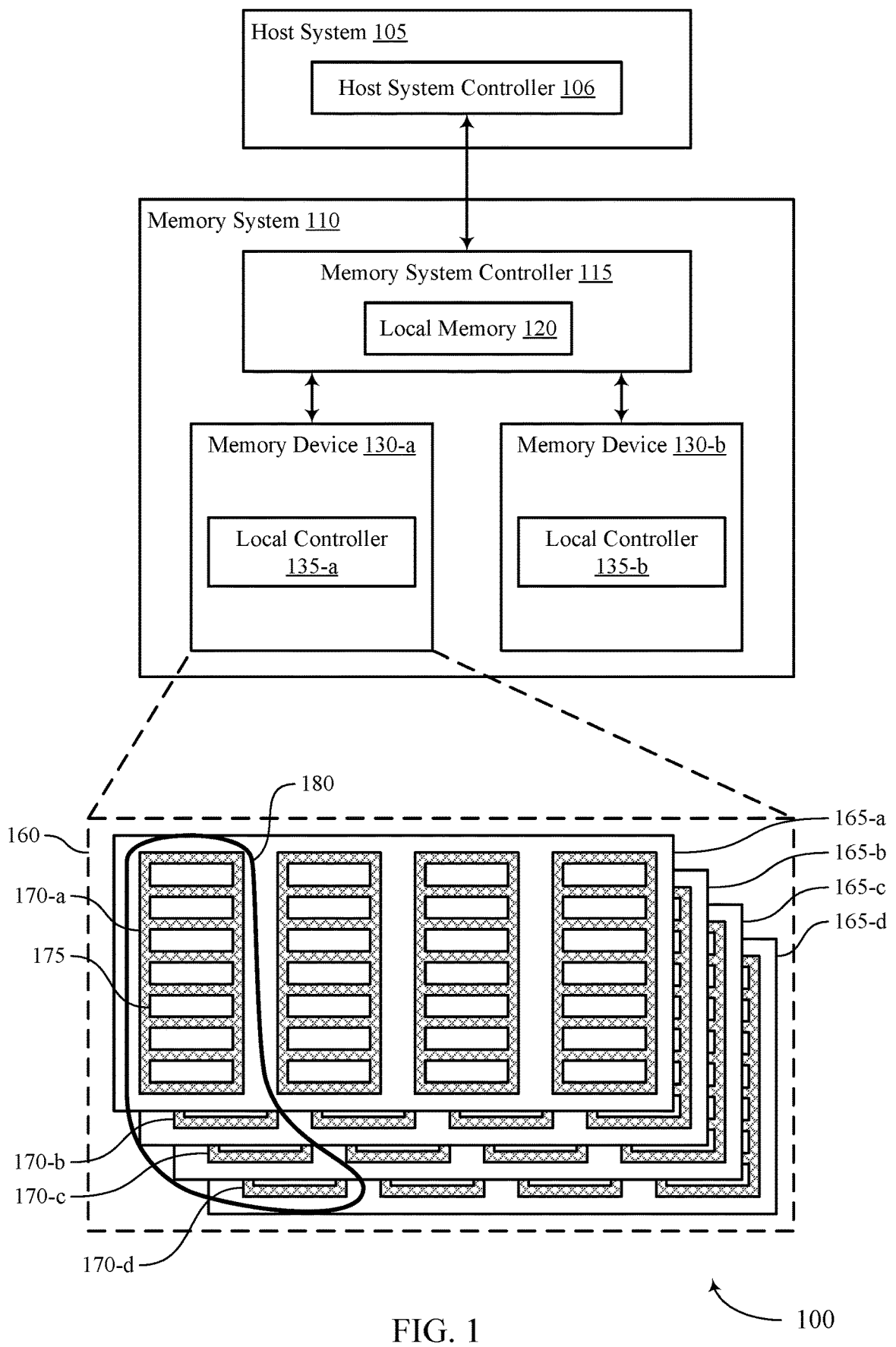
FIG. 1 illustrates an example of a system that supports partitioned transferring for write booster in accordance with examples as disclosed herein.

Features of the disclosure are initially described in the context of systems with reference to FIG. 1. Features of the disclosure are described in the context of data flow diagrams with reference to FIGS. 2A through 3C. These and other features of the disclosure are further illustrated by and described in the context of an apparatus diagram and flowchart that relate to partitioned transferring for write booster with reference to FIGS. 4 and 5.

FIG. 1 illustrates an example of a system 100 that supports partitioned transferring for write booster in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component inter-connect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new; valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support partitioned transferring for write booster. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Techniques are described for a memory system 110 to transfer data from a buffer associated with a write booster mode to higher-density blocks of the memory system 110 based on a type of the data stored in the buffer. A first type of data may be transferred from the buffer to the higher-density blocks before a second type of data may be transferred from the buffer to the higher-density blocks. Prioritizing the transfer of data from the buffer to the higher-density block based on the type of data may reduce a write amplification associated with the memory system 110.

FIGS. 2A, 2B, 2C, and 2D illustrate examples data flow diagrams that support partitioned transferring for write booster in accordance with examples as disclosed herein. Each data flow diagram (e.g., data flow diagram 200)-a, data flow diagram 200-b, data flow diagram 200-c, and data flow diagram 200-d) illustrates similar components at different stages of an operation to transfer data from a write booster buffer to higher-density storage in a memory system. The data flow diagrams illustrate an example of an operation to transfer the data and other examples are within the scope of the disclosure.

The data flow diagrams (e.g., data flow diagram 200-a, data flow diagram 200-b, data flow diagram 200-c, and data flow diagram 200-d) may be implemented by the system 100 as described with reference to FIG. 1. Each data flow diagram (e.g., data flow diagram 200-a, data flow diagram 200-b, data flow diagram 200-c, and data flow diagram 200-d) illustrates a host system 205 and a memory system 210 configured to store data received from the host system 205 and to send data to the host system 205, if requested by the host system 205 using access commands (e.g., read commands or write commands). The host system 205 may be an example of a host system 105 described with reference to FIG. 1. The memory system 210 may be an example of the memory system 110 described with reference to FIG. 1. The memory system 210 may include one or more memory devices partitioned into a buffer 215 (e.g., a write booster buffer) and one or more higher-density blocks 220.

Figure 2A:
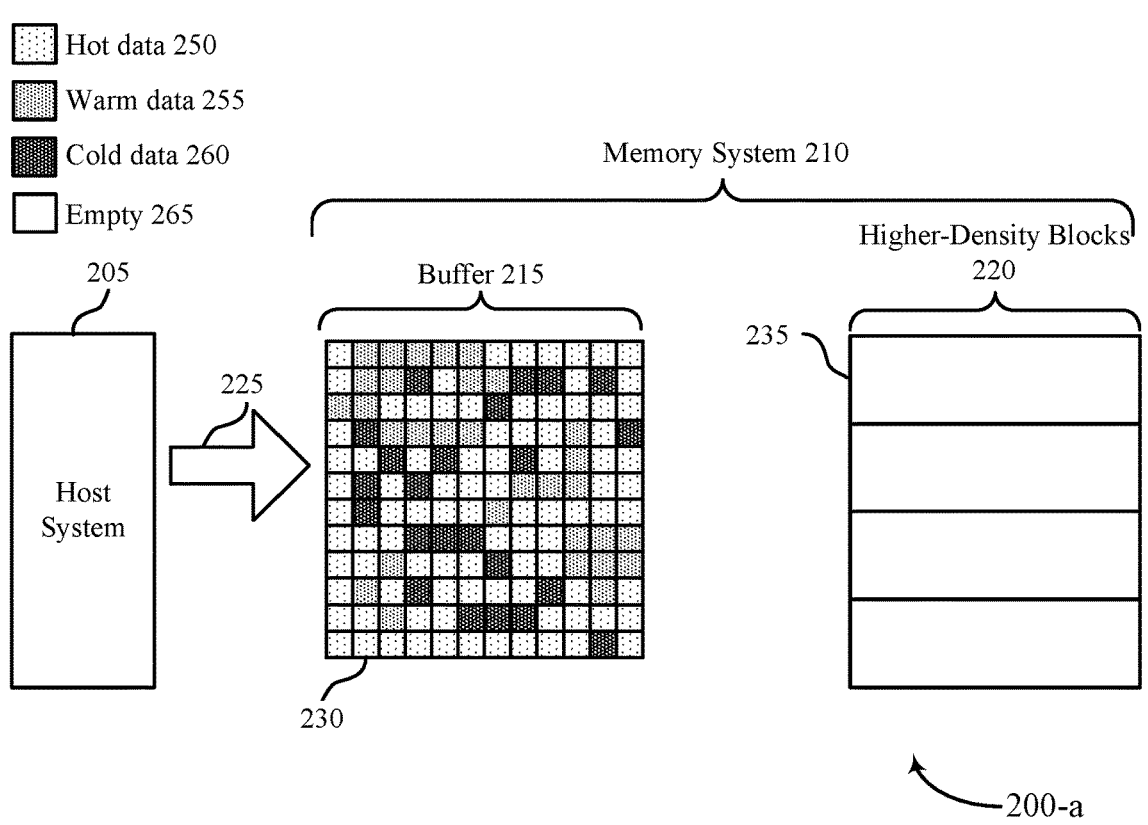
FIGS. 2A, 2B, 2C, and 2D illustrate examples of data flow diagrams that support partitioned transferring for write booster in accordance with examples as disclosed herein.

FIG. 2A illustrates an example of a data flow diagram 200-a that supports partitioned transferring for write booster in accordance with examples as disclosed herein. Techniques are described for transferring data from the buffer 215 to the higher-density blocks 220 based on the type of data stored in the buffer 215. The data flow diagram 200-a illustrates a portion of such a transfer operation.

The memory system 210 may include a first portion (e.g., the buffer 215) and a second portion (e.g., the higher-density blocks 220). The buffer 215 may be an example of the SLC portion of memory. In some cases, a memory system 210 may include memory cells configured to each store one bit of information, which may be referred to as SLCs. The higher-density blocks 220 may be an example of a portion of memory comprising multiple level cells. The multiple level cells may include multi-level cells (e.g., MLC) configured to store two bits of data, triple-level cell (e.g., TLC) configured to store three bits of data, or quad-level cells (e.g., QLC) configured to store four bits of data. In such cases, the higher-density blocks 220 may be an example of the MLC portion of memory, the TLC portion of memory, QLC portion of memory, other higher-density storage options, or any combination thereof.

A memory system 210 may include memory cells configured to each store multiple bits of information, which may be referred to as MLCs if configured to each store two bits of information, as TLCs if configured to each store three bits of information, as QLCs if configured to each store four bits of information, or more generically as multiple-level memory cells. Multiple-level memory cells may provide greater density of storage relative to SLC memory cells but may, in some cases, involve narrower read or write margins, greater complexities for supporting circuitry, and increased times for reading data and writing data.

The buffer 215 may be an example of the write booster buffer. The buffer 215 may be an example of a buffer of SLCs associated with write booster information. For example, the buffer 215 may be an example of a SLC portion of memory that may include SLC blocks dedicated for the write booster mode.

Operating in write booster mode may enable the memory system 210 to handle a higher volume of write commands from the host system 205 and reduce an impact on latency performance for performing those commands. In scenarios with nominal traffic to the memory system 210, the memory system 210 may write data directly into the higher-density blocks 220 (e.g., MLC, TLC, or QLC). This can reduce write amplification (WA), total bytes written (TBW), and extend the life of the memory system 210. Writing data directly in the higher-density blocks 220, however, may take more time than writing data into SLC blocks. In scenarios where the memory system 210 receives a high-volume of write commands in a short duration, the memory system 210 processing capabilities may become saturated and the latency for performing access operations (e.g., write operations and read operations) may increase. Some memory systems include a write booster mode to improve performance during such scenarios.

In a write booster mode, the memory system 210 may initially write data received from the host system 205 into a write booster buffer (e.g., the buffer 215) that is one or more blocks of SLC memory. Because writing to SLC takes less time than writing to MLC, TLC, or QLC, using the write booster mode can reduce the latency of performing access commands. Later, the memory system 210 may transfer the data from the buffer 215 to higher-density blocks 220 as a background operation that has a reduced impact on the performance of the memory system 210 seen by the host system 205. For example, the memory system 210 may determine it is in an idle state (among other conditions), and transfer the information from the buffer 215 to the higher-density blocks 220. Such transfer operations, however, may increase the WA and TBW experienced by the memory system 210.

In some examples, the host system 205 may control when the memory system 210 operates in the write booster mode may sending signaling to the memory system 210 to enter and/or exit the write booster mode. For example, the memory system 210 may receive a command from the host system 205 that instructs the memory system 210 to write the data into a specific buffer (e.g., buffer 215) for faster performance. In some examples, the memory system 210 may control when the memory system 210 operates in the write booster mode.

For example, the host system 205 may send a write boost write command to the memory system 210. The memory system 210 may receive the write boost write command and initiate the write booster mode. The memory system 210 may activate a write booster mode in response to receiving the write booster command. In some cases, the memory system 210 may configure blocks of memory cells (e.g., NAND memory cells) to be written to as part of operating in the write booster mode. For example, the memory system 210 may write data to the SLC portion of memory which may allow the memory system 210 to write information faster than writing to the TLC portion or QLC portion. During the write booster mode, the memory system 210 may receive write commands and data to be written to the memory system (e.g., at 225) from the host system 205. In response to receiving the write commands and data, the memory system 210 may begin to store at least some of that data in the buffer 215 (e.g., SLC portion of memory) to improve the latency for performing the write operations. Writing data into SLC portions of memory may take less time than writing to higher-density portions of memory. In some cases, the memory system 210 may apply redundant array of independent NAND (RAIN) protection to the data as part of writing the data into the buffer 215.

The buffer 215 may be configured with a finite quantity of pages 230 to store the data. Because the buffer 215 has limited space, the buffer 215 can become full (e.g., above a threshold of storing information that the buffer 215 cannot store additional information). If the buffer 215 becomes full, the memory system 210 may write data directly to higher-density blocks 220 (e.g., without using write booster mode operations), which may increase the latency for performing the write commands.

The memory system 210 may include operations for triggering the transfer of the data stored in the buffer 215 to the higher-density blocks 220. For example, the memory system 210 may determine whether the write booster is above a fullness threshold and transfer at least some data in response to the fullness threshold being satisfied. Additionally or alternatively, the memory system 210 may trigger the transfer of data from the buffer 215 to the higher-density blocks 220 in response to the memory system 210 being in a less busy condition (e.g., the memory system 210 is in an idle state, a hibernate state, other low-power state, or the quantity of commands being received from the host system 205 is below a threshold). In some examples, an operation to transfer data from the buffer 215 to the higher-density blocks 220 may be referred to as a flush operation, a flushing operation, or flushing the buffer 215, among other similar names.

In some cases, triggers to transfer data from the buffer 215 to the higher-density blocks 220 may treat the data stored in the buffer 215 similarly. In such cases, the data that is transferred from the buffer 215 based on relatively simple prioritization schemes (e.g., first-in, first-out or other schemes). Additionally or alternatively, if the data transferred from the buffer 215 is not large enough to fill an entire page of the higher-density blocks 220, dummy data may be added as part of the transfer. Such techniques may result in more frequent garbage collection operations being performed on the higher-density blocks 220 after the transfer operation, which may result in higher WA and TBW for the memory system 210.

A memory system 210 may be configured to transfer data from a buffer 215 to higher-density blocks 220 based on a type of the data stored in the buffer 215. Examples of types of data may include hot data 250, warm data 255, and hot data 260. Hot data 250 may refer to data that is frequently accessed either to read, invalidated, erased, or overwritten. Examples of hot data 250 may include data used by real-time analytics, streaming, sensor data, or other types of use cases. In some cases, to improve performance, hot data 250 may be stored in storage that is quickly accessible by the host system 205. Hot data 260 may refer to data that is more rarely accessed (e.g., hot data 260 may be seldomly (or never) read, invalidated, erased, or overwritten) than hot data 250. Examples of hot data 260 may be data that is archived (e.g., for compliance reasons) or other use cases. In some cases, to improve performance, hot data 260 may be stored in storage that is relatively slow to access and may thus be cheaper than other types of storage. Warm data 255 may refer to data this accessed more frequently than hot data 260 but less frequently than hot data 250. Examples of warm data 255 may include data for applications that are accessed less frequently or other types of use cases. In some cases, to improve performance, warm data 255 may be stored in storage that is configured for both capacity and good access performance. In some cases, hot data 250 may be invalidated in seconds (or less) while hot data 260 or warm data 255 may persist for much longer times. While three different types of data are described (e.g., hot data 250), warm data 255, and cold data 260), the memory system may include any quantity of types of data. In some examples, the host system 205 and the memory system 210 may support two types of data (e.g., hot data 250) and cold data 260). In some examples, the host system 205 and the memory system 210 may support three or more states that may include hot data, cold data, and any quantity of warm data types (e.g., one warm data type, two warm data types, three warm data types, four warm data types, five warm data types, six warm data types, seven warm data types, eight warm data types). The techniques described herein may be applied to a memory system 210 that supports any quantity of types of data.

The buffer 215 includes a plurality of pages 230. The data flow diagram 200-a illustrates some of the pages 230 of the buffer 215 and illustrates a status of each page 230. For example, some of the pages 230) may store hot data 250, some of the pages 230 may store warm data 255, some of the pages 230 may store cold data 260, and some of the pages 230 may be empty 265 as shown by the shading of the various pages. In some cases, to be empty 265 may mean that the page is marked as free and available to store data regardless of whether the page still stores some data that has been invalided or stores some dummy data.

The higher-density blocks 220 may include a plurality of blocks 235. The data flow diagram 200-a illustrates some of the blocks 235 of the higher-density blocks 220 and illustrates a status of each block 235. For example, some of the blocks 235 may store hot data 250), some of the blocks 235 may store warm data 255, some of the blocks 235 may store cold data 260, and some of the blocks 235 may be empty 265 as shown by the shading of the various blocks. In some cases, to be empty 265 may mean that the block is marked as free and available to store data regardless of whether the block still stores some data that has been invalided or stores some dummy data.

The type of the data may be identified using a variety of ways. In some examples, the host system 205 may determine the type of the data being stored and may transmit an indication of the type of the data to the memory system 210. The host system 205 may use information about the source of the data, the application associated with the data, or other factors to determine the type of the data. The indication transmitted by the host system 205 may be explicitly signaled using one or more bits dedicated to indicating (e.g., one bit, two bits, three bits, four bits, five bits, six bits, seven bits, eight bits). In some examples, the indication transmitted by the host system 205 may be encoded to indicate the type of the data and other information. In such examples, the indication may be decoded by the memory system 210 and the memory system 210 may determine the type of the data and the other information encoded in the indication. In some examples, the indication may be implicitly signaled by the host system 205. In such examples, the host system 205 may provide information about the data to be written to the memory system 210 and the memory system 210 may use that information to determine the type of the data. The indication may be transmitted as part of a write command, as part of the data associated with the write command, as a separate command, as separate metadata, or a combination thereof. In some examples, the memory system 210 determine the type of the data being stored using any of the techniques described above. In some examples, indication may be an example of a stream identifier or may be an example of one or more bits of a stream identifier associated with the data or the write command.

In some examples, the indication may be stored with the data in the buffer 215. In such examples, the memory system 210 may identify the type of the data stored in a page 230 of the buffer 215 by the associated indication. In some examples, memory system 210 may maintain a mapping of the pages 230 of the buffer 215. The mapping may indicate what type of data is stored in a particular page 230. The mapping of the buffer 215 may be based on pages of the buffer 215 or any other subdivision of memory—such as pages, blocks, sections, planes, or other divisions. The term pages 230 is used as an illustrative example of a division of the buffer 215. The term pages may be used interchangeably with other divisions of memory—such as pages, blocks, sections, planes, or other divisions—without loss of meaning.

Techniques are described for a memory system 210 to transfer data from a buffer 215 to higher-density blocks 220 based on a type of the data stored in the buffer 215. A first type of data may be transferred from the buffer 215 to the higher-density blocks 220 before a second type of data may be transferred from the buffer 215 to the higher-density blocks 220. Prioritizing the transfer of data from the buffer 215 to the higher-density block 220 based on the type of data may reduce a write amplification associated with the memory system. For example, cold data 260 may be transferred before warm data 255 or hot data 250. In such examples, the hot data 250 may be invalidated or altered before transferring to the higher-density blocks 220 thus reducing a quantity of data transferred from the buffer 215 to the higher-density block 220.

Figure 2B:
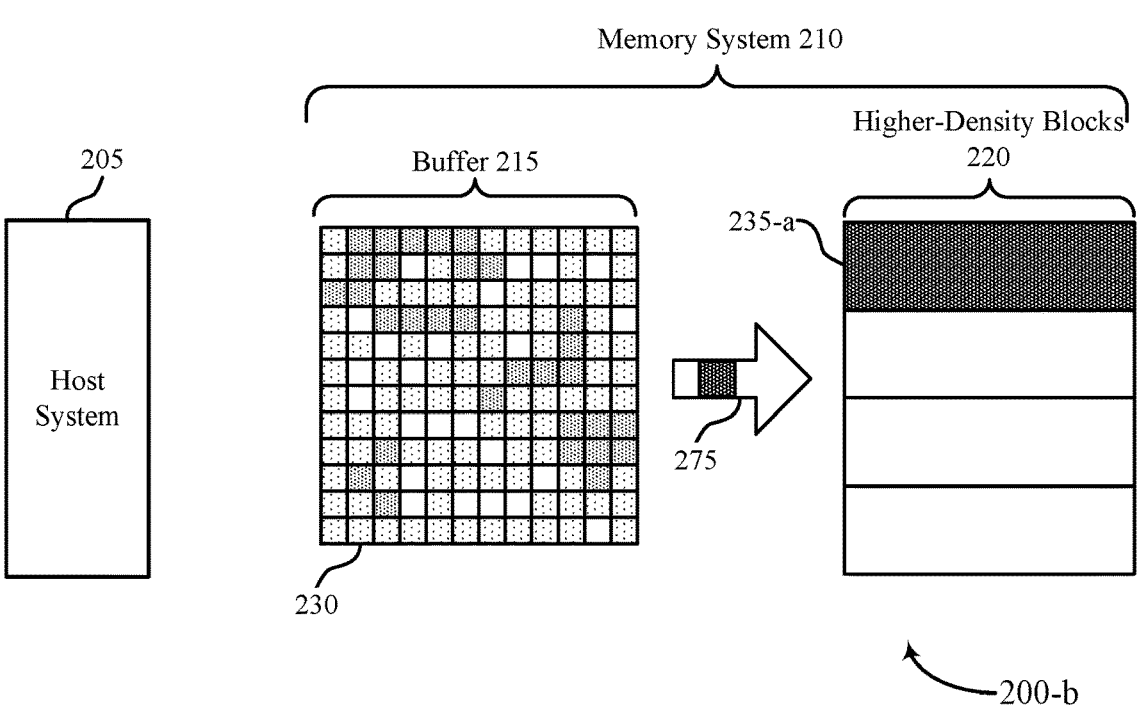

FIG. 2B illustrates an example of a data flow diagram 200-*b* that supports partitioned transferring for write booster in accordance with examples as disclosed herein. Techniques are described for transferring data from the buffer 215 to the higher-density blocks 220 based on the type of data stored in the buffer 215. The data flow diagram 200-*b* illustrates a portion of such a transfer operation. For example, the data flow diagram 200-*b* illustrates transferring cold data 260 from the buffer 215 to the higher-density blocks 220 before transferring at least a portion of the warm data 255 or hot data 250.

The buffer 215 (e.g., the write booster buffer) may be designed to store data temporarily in SLC blocks until the data can be transferred to higher-density blocks 220. Such a configuration for the buffer 215 may enable the memory system 210 to improve the latency used by the memory system 210 to execute commands received from the host system 205, especially when there is a large quantity of commands to perform. To ensure that the buffer 215 is available to handle periods of high-traffic, the memory system 210 may periodically empty the buffer 215.

The memory system 210 may use a set of criteria to determine when and how to flush the buffer 215 (e.g., transfer data stored in the buffer 215 to the higher-density blocks 220). In some cases, the memory system 210 determine a time to flush the buffer 215 that has a smaller impact (e.g., no impact on) a latency to execute commands from the host system 205. In some cases, the memory system 210 may determine that it is in an idle to determine to flush the buffer 215. In some cases, the memory system 210 may determine that the queue of commands from the host system 205 is less than a threshold. The memory system 210 may transfer data from the buffer 215 to the higher-density blocks 220 as part of a background operation that occurs with a small to minimal impact on latency performance seen by the host system 205.

In response to the memory system 210 determining that a time could be used flush the buffer 215, the memory system 210 may determine how to flush the buffer 215. In some examples, the memory system 210 may transfer some or all of the data from the buffer 215 into the higher-density blocks 220 without regard to the type of the data stored in the buffer 215. Such procedures may increase the WA and TBW of the memory system 210. For example, if hot data 250 is stored in the buffer 215 and is transferred to the higher-density blocks 220, the hot data 250 may invalidated relative quickly. This may result in the block of the higher-density block 220 to be garbage collected relative soon (e.g., have a garbage collection operation applied to the block). A garbage collection operation in a NAND memory device may identify one or more source blocks that have a quantity of valid data below a threshold. The garbage collection may then transfer valid data from the source block to a target block and erase the source block.

Techniques are described for doing a staged transfer operation of data stored in the buffer 215 to the higher-density blocks 220 based on the type of the data stored in the buffer 215. The staged transfer operation may include using a first set of criteria to transfer cold data 260, using a second set of criteria to transfer warm data 255, and using a third set of criteria to transfer hot data 250. The data flow diagram 200-*b* illustrates the transfer of cold data 260 from the buffer 215 to the higher-density blocks 220. In some examples, the staged transfer operation may be an example of a cascaded transfer operation that transfers different types of information at different times.

The memory system 210 may determine that the first set of criteria for transferring cold data 260 from the buffer 215 to the higher-density blocks 220 is satisfied. The first set of criteria may include a determination of whether the memory system 210 is in a condition to transfer data from the buffer 215 to the higher-density block 220 without too much impact on the latency for performing commands received from the host system 205. For example, the first set of criteria may include determining that the memory system 210 is in an idle state or that a queue of commands received from the host system 205 is below threshold. The first set of criteria may also include determining whether cold data 260 is present in the buffer 215. If cold data 260 is not present, then the first set of criteria may not be satisfied. The first set of criteria may also include determining whether the quantity of pages 230 of the buffer 215 that are storing valid data satisfy a threshold. An example of such a threshold may include that 50% of the total quantity of pages 230 of the buffer 215 store valid data (e.g., the buffer 215 is 50% full). Other examples of the threshold may include that the buffer 215 is 5%, 10%, 15%, 20% 25%, 30%, 35%, 40%, 45%, 50%, 55%, 60%, 65%, 70%, 75%, 80%, 85%, 90%, 95%, or 100% full. In response to determining that the first set of criteria is satisfied, the memory system 210 may transfer (at 275) the cold data 260 from the buffer 215 to the higher-density blocks 220.

In some examples, the first set of criteria may include that the memory system 210 is in an idle mode, that the buffer 215 is at least 50% full, and that cold data 260 is present in the buffer 215. If the first set of criteria is satisfied, the memory system 210 may transfer cold data 260 from the buffer 215 to the higher-density blocks 220. In some cases, the memory system 210 may transfer the cold data 260 until the first set of criteria are no longer satisfied. In some cases, the memory system 210 may transfer the cold data 260 until the cold data 260 is transferred out of the buffer 215. In some cases, the memory system 210 may transfer the cold data 260 until the percentage full of the buffer 215 satisfies a threshold and/or until a quantity of cold data 260 satisfies a threshold. In some cases, the first set of criteria may include determining whether a quantity of the cold data 260 stored in the buffer 215 satisfies a threshold.

In response to the cold data 260 being transferred, the memory system 210 may indicate that the pages 230 of the buffer 215 that formerly stored the cold data 260 are free for future use. For example, the memory system 210 may add those pages 230 to a free page list associated with the buffer 215. In some cases, the memory system 210 may determine whether writing the quantity of the data to the higher-density blocks 220 is successful. If the writing is successful, the memory system 210 may indicate that the data stored in the various pages in the buffer 215 is invalid, in some cases. In some cases, the memory system 210 may not apply redundant RAIN protection to the data as part of writing the data into the higher-density blocks 220 at 275. Such cases may occur because the memory system 210 may refrain from erasing (e.g., releasing, overwriting) the data stored in the buffer 215 until it confirms that the copy of the data is successfully stored in the higher-density blocks 220.

The memory system 210 may store the cold data 260 in one or more first blocks 235-*a* of the higher-density blocks 220. The one or more first blocks 235-*a* may be examples of MLC blocks, TLC blocks, QLC blocks, or other type of blocks. The transfer operation may result in the cold data 260 being grouped in sequential locations within the higher-density blocks 220, it may reduce a quantity of garbage collection operations performed by the memory system 210 later on the higher-density blocks. A garbage collection operation transfers valid data out of source blocks to target blocks after a quantity of valid data in the source block satisfies a threshold (or a quantity of invalid data in the source block satisfies a threshold). By grouping cold data 260 in the same block, it reduces a likelihood that the data will be invalidated and thus may reduce the quantity of data transferred as part of later garbage collection operations.

In some examples, the memory system 210 may transfer the cold data 260 to a higher-density block than the blocks used to store the warm data 255 or the hot data 250. For example, because it is less likely that a block that stores the cold data 260 may experience a garbage collection operation in a duration than a block that stores warm data 255 or hot data 260, higher-density storage may make sense. For example, cold data 260 may be stored in a QLC block while other types of data may be stored in TLC blocks. In other examples, cold data 260 and/or warm data 255 may be stored in QLC blocks while hot data may be stored in TLC blocks. While QLC blocks and TLC blocks are used for illustration purposes, any density of blocks may be used.

Figure 2C:
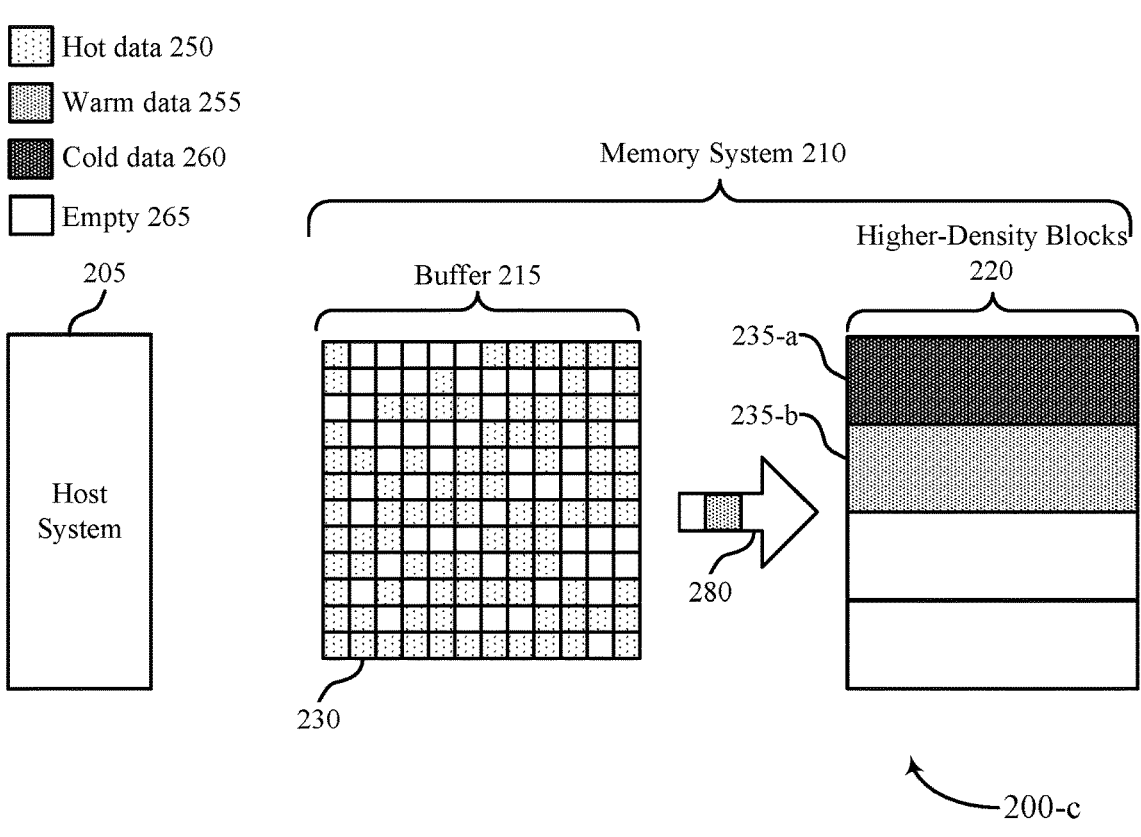

FIG. 2C illustrates an example of a data flow diagram 200-*c* that supports partitioned transferring for write booster in accordance with examples as disclosed herein. Techniques are described for transferring data from the buffer 215 to the higher-density blocks 220 based on the type of data stored in the buffer 215. The data flow diagram 200-*c* illustrates a portion of such a transfer operation. For example, the data flow diagram 200-*c* illustrates transferring warm data 255 from the buffer 215 to the higher-density blocks 220 after transferring at least a portion of the cold data 260 or before transferring at least a portion of the hot data 250.

The memory system 210 may determine that the second set of criteria for transferring warm data 255 from the buffer 215 to the higher-density blocks 220 is satisfied. The second set of criteria may include a determination of whether the memory system 210 is in a condition to transfer data from the buffer 215 to the higher-density block 220 without too much impact on the latency for performing commands received from the host system 205. For example, the second set of criteria may include determining that the memory system 210 is in an idle state or that a queue of commands received from the host system 205 is below threshold. The second set of criteria may also include determining whether warm data 255 is present in the buffer 215. If warm data 255 is not present, then the second set of criteria may not be satisfied. The second set of criteria may also include determining whether cold data 260 is present in the buffer 215. If cold data 260 is present, the memory system 210 may first transfer the cold data 260 before transferring the warm data 255. The second set of criteria may also include determining whether the quantity of pages 230 of the buffer 215 that are storing valid data satisfy a threshold. In response to determining that the second set of criteria is satisfied, the memory system 210 may transfer (at 280)) the warm data 255 from the buffer 215 to the higher-density blocks 220. Examples of the threshold of pages that store valid data for the buffer 215 are described with reference to FIG. 2B.

In some examples, the second set of criteria may include that the memory system 210 is in an idle mode, that the buffer 215 is at least 50% full, that cold data 260 is not present in the buffer 215, and that warm data 255 is present in the buffer 215. If the second set of criteria is satisfied, the memory system 210 may transfer warm data 255 from the buffer 215 to the higher-density blocks 220. In some cases, the memory system 210 may transfer the warm data 255 until the second set of criteria are no longer satisfied. In some cases, the memory system 210 may transfer the warm data 255 until the warm data 255 is transferred out of the buffer 215. In some cases, the memory system 210 may transfer the warm data 255 until the percentage full of the buffer 215 satisfies a threshold and/or until a quantity of warm data 255 satisfies a threshold. In some cases, the second set of criteria may include determining whether a quantity of the warm data 255 stored in the buffer 215 satisfies a threshold.

In response to the warm data 255 being transferred, the memory system 210 may indicate that the pages 230 of the buffer 215 that formerly stored the warm data 255 are free for future use. For example, the memory system 210 may add those pages 230 to a free page list associated with the buffer 215. In some cases, the memory system 210 may determine whether writing the quantity of the data to the higher-density blocks 220 is successful. If the writing is successful, the memory system 210 may indicate that the data stored in the various pages in the buffer 215 is invalid, in some cases. In some cases, the memory system 210 may not apply redundant RAIN protection to the data as part of writing the data into the higher-density blocks 220 at 280. Such cases may occur because the memory system 210 may refrain from erasing (e.g., releasing, overwriting) the data stored in the buffer 215 until it confirms that the copy of the data is successfully stored in the higher-density blocks 220.

The memory system 210 may store the warm data 255 in one or more second blocks 235-*b* of the higher-density blocks 220. The one or more second blocks 235-*b* may be examples of MLC blocks, TLC blocks, QLC blocks, or other type of blocks. The transfer operation may result in the warm data 255 being grouped in sequential locations within the higher-density blocks 220, and it may reduce a quantity of garbage collection operations performed by the memory system 210 later on the higher-density blocks 220. A garbage collection operation transfers valid data out of source blocks to target blocks after a quantity of valid data in the source block satisfies a threshold (or a quantity of invalid data in the source block satisfies a threshold). By grouping warm data 255 in the same block, it reduces a likelihood that the data will be invalidated and thus may reduce the quantity of data transferred as part of later garbage collection operations.

Figure 2D:
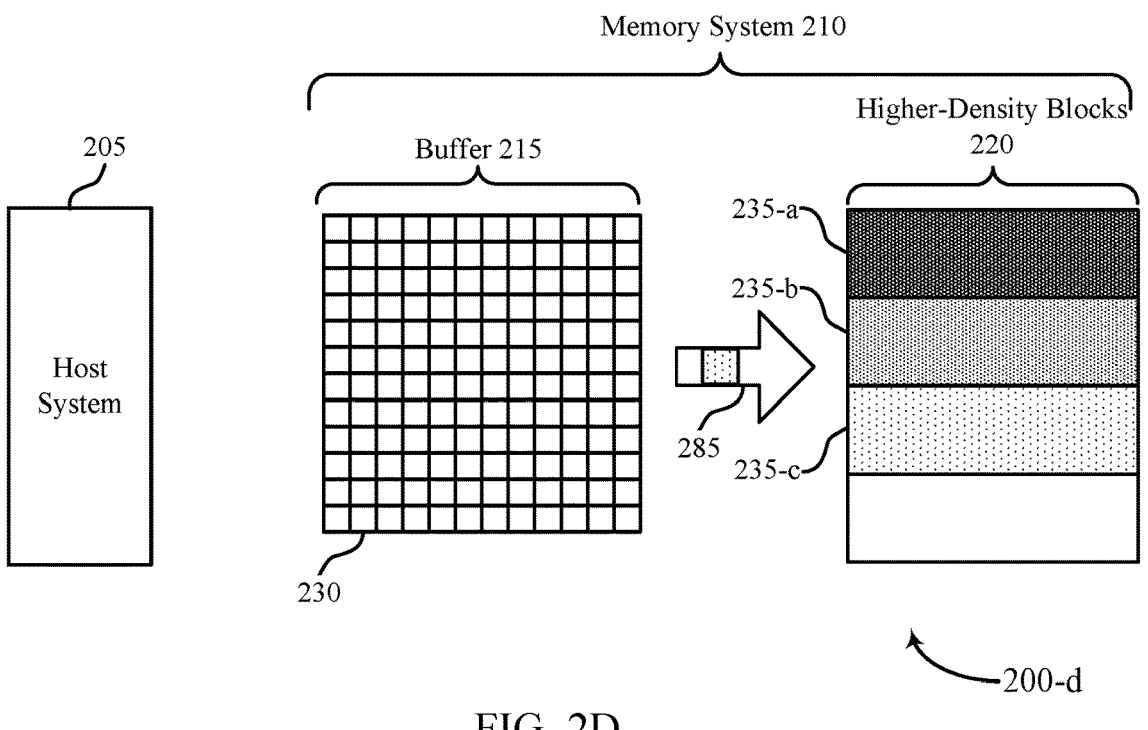

FIG. 2D illustrates an example of a data flow diagram 200-*d* that supports partitioned transferring for write booster in accordance with examples as disclosed herein. Techniques are described for transferring data from the buffer 215 to the higher-density blocks 220 based on the type of data stored in the buffer 215. The data flow diagram 200-*d* illustrates a portion of such a transfer operation. For example, the data flow diagram 200-*d* illustrates transferring hot data 250 from the buffer 215 to the higher-density blocks 220 after transferring at least a portion of the cold data 260 and/or after transferring at least a portion of the warm data 255.

The memory system 210 may determine that the third set of criteria for transferring hot data 250 from the buffer 215 to the higher-density blocks 220 is satisfied. The third set of criteria may include a determination of whether the memory system 210 is in a condition to transfer data from the buffer 215 to the higher-density block 220 without too much impact on the latency for performing commands received from the host system 205. For example, the third set of criteria may include determining that the memory system 210 is in an idle state or that a queue of commands received from the host system 205 is below threshold. The third set of criteria may also include determining whether hot data

250 is present in the buffer 215. If hot data 250 is not present, then the third set of criteria may not be satisfied. The third set of criteria may also include determining whether cold data 260 is present in the buffer 215. If cold data 260 is present, the memory system 210 may first transfer the cold data 260 before transferring the hot data 250. The third set of criteria may also include determining whether warm data 255 is present in the buffer 215. If warm data 255 is present, the memory system 210 may first transfer the warm data 255 before transferring the hot data 250. The third set of criteria may also include determining whether the quantity of pages 230 of the buffer 215 that are storing valid data satisfy a threshold. In response to determining that the second set of criteria is satisfied, the memory system 210 may transfer (at 285) the warm data 255 from the buffer 215 to the higher-density blocks 220. Examples of the threshold of pages that store valid data for the buffer 215 are described with reference to FIG. 2B.

In some examples, the second set of criteria may include that the memory system 210 is in an idle mode, that the buffer 215 is at least 75% full, that cold data 260 and/or warm data 255, is not present in the buffer 215, and that hot data 250 is present in the buffer 215. If the third set of criteria is satisfied, the memory system 210 may transfer hot data 250 from the buffer 215 to the higher-density blocks 220. In some cases, the memory system 210 may transfer the hot data 250 until the third set of criteria are no longer satisfied. In some cases, the memory system 210 may transfer the hot data 250 until the hot data 250 is transferred out of the buffer 215. In some cases, the memory system 210 may transfer the hot data 250) until the percentage full of the buffer 215 satisfies a threshold and/or until a quantity of hot data 250) satisfies a threshold. In some cases, the third set of criteria may include determining whether a quantity of the hot data 250 stored in the buffer 215 satisfies a threshold.

In response to the hot data 250 being transferred, the memory system 210 may indicate that the pages 230 of the buffer 215 that formerly stored the hot data 250 are free for future use. For example, the memory system 210 may add those pages 230 to a free page list associated with the buffer 215. In some cases, the memory system 210 may determine whether writing the quantity of the data to the higher-density blocks 220 is successful. If the writing is successful, the memory system 210 may indicate that the data stored in the various pages in the buffer 215 is invalid, in some cases. In some cases, the memory system 210 may not apply redundant RAIN protection to the data as part of writing the data into the higher-density blocks 220 at 285. Such cases may occur because the memory system 210 may refrain from erasing (e.g., releasing, overwriting) the data stored in the buffer 215 until it confirms that the copy of the data is successfully stored in the higher-density blocks 220.

The memory system 210 may store the hot data 250 in one or more third blocks 235-*c* of the higher-density blocks 220. The one or more third blocks 235-*c* may be examples of MLC blocks, TLC blocks, QLC blocks, or other type of blocks. The transfer operation may result in the hot data 250 being grouped in sequential locations within the higher-density blocks 220, and it may reduce a quantity of garbage collection operations performed by the memory system 210 later on the higher-density blocks 220. For example, by grouping the hot data in common blocks, those blocks may experience relatively frequent garbage collection. However, the blocks that store cold data 260 and/or warm data 255 may experience relatively fewer garbage collection operations. A garbage collection operation transfers valid data out of source blocks to target blocks after a quantity of valid data in the source block satisfies a threshold (or a quantity of invalid data in the source block satisfies a threshold). By grouping warm data 255 in the same block, it reduces a likelihood that the data will be invalidated and thus may reduce the quantity of data transferred as part of later garbage collection operations.

FIGS. 3A, 3B, and 3C illustrate examples of data flow diagrams that support partitioned transferring for write booster in accordance with examples as disclosed herein. Each data flow diagram (e.g., data flow diagram 300-a, data flow diagram 300-b, and data flow diagram 300-c) illustrates similar components at different stages of an operation to transfer data from a write booster buffer to higher-density storage in a memory system. The data flow diagrams illustrate an example of an operation to transfer the data and other examples are within the scope of the disclosure.

The data flow diagrams (e.g., data flow diagram 300-a, data flow diagram 300-b, and data flow diagram 300-c) may be implemented by the systems described with reference to FIGS. 1, 2A, 2B, 2C, and 2D. Each data flow diagram (e.g., data flow diagram 300-a, data flow diagram 300-b, and data flow diagram 300-c) illustrates a host system 205 and a memory system 210 configured to store data received from the host system 205 and to send data to the host system 205, if requested by the host system 205 using access commands (e.g., read commands or write commands).

The data flow diagrams (e.g., data flow diagram 300-a, data flow diagram 300-b, and data flow diagram 300-c) illustrate portions of the transfer operation that may be combined with the portions of the transfer operation described with reference to FIGS. 2A, 2B, 2C, and 2D. Concepts that are described in FIGS. 2A, 2B, 2C, and 2D may be referenced in FIGS. 3A, 3B, and 3C without repeating the earlier description.

FIG. 3A illustrates an example of a data flow diagram 300-a that supports partitioned transferring for write booster in accordance with examples as disclosed herein. Techniques are described for transferring data from the buffer 215 to the higher-density blocks 220 based on the type of data stored in the buffer 215. The data flow diagram 300-a illustrates a portion of such a transfer operation. For example, the data flow diagram 300-a illustrates initial conditions of a buffer 215 for such a transfer operation.

The data flow diagram 300-a illustrates a memory system 210 that includes a buffer 215. The buffer 215 may include a quantity of pages 230 that store hot data 250. The buffer 215 shows the hot data 250 grouped in sequential pages, but that is for illustrative purposes only. The data flow diagrams illustrate an advantage of a staged transfer operation that leaves the hot data 250 in the buffer 215 longer than the warm data 255 and/or the cold data 260.

FIG. 3B illustrates an example of a data flow diagram 300-b that supports partitioned transferring for write booster in accordance with examples as disclosed herein. Techniques are described for transferring data from the buffer 215 to the higher-density blocks 220 based on the type of data stored in the buffer 215. The data flow diagram 300-b illustrates a portion of such a transfer operation. For example, the data flow diagram 300-b illustrates that hot data 250, warm data 255, and/or cold data 260 may be added to the buffer 215 after the initial conditions and other operations that may occur.

The data flow diagram 300-b illustrates a host system 205 and a memory system 210 that includes a buffer 215. If the memory system 210 is operating in the write booster mode, the memory system 210 may store data in the buffer 215 at 305. The buffer 215 then includes the data it already had stored (e.g., as shown and described with reference to FIG. 3A) and the additional data that has been added. The additional data may include hot data 250, warm data 255, and/or cold data 260.

Additionally or alternatively, while the data is stored in the buffer 215, some of the data may be invalidated. For example, hot data 250 may have a relatively short life. After the host system 205 is finished with data (e.g., hot data 250, warm data 255, and/or cold data 260), the host system 205 may indicate to the memory system 210 that the data is invalid and that it can be discarded (e.g., using a garbage collection operation). For example, some of the hot data 250 included in the buffer 215 may be invalidated before it transferred to the higher-density blocks 220. A page 310 illustrates how a page that formerly stored hot data 250 may be invalidated by the host system 205. In response to the data being invalidated, the memory system 210 may indicate that the page (e.g., page 310) is free for future use.

An advantage to leaving hot data 250 and/or warm data 255 in the buffer 215 is that the WA and TBW of the memory system 210 if the data is invalidated before the data is transferred to the higher-density blocks 220. It may be reduce the WA and TBW by reducing a likelihood that the data is transferred from the buffer 215 to the higher-density blocks 220 because the data is invalidated before the transfer criteria for that data is satisfied. It may also reduce the WA and TBW by reducing a quantity of garbage collection operations performed in the higher-density blocks 220 after the data is transferred. For example, hot data 250 may invalidated soon after being transferred to the higher-density blocks, which may increase a frequency of garbage collection operations.

FIG. 3C illustrates an example of a data flow diagram 300-c that supports partitioned transferring for write booster in accordance with examples as disclosed herein. Techniques are described for transferring data from the buffer 215 to the higher-density blocks 220 based on the type of data stored in the buffer 215. The data flow diagram 300-c illustrates a portion of such a transfer operation. For example, the data flow diagram 300-c illustrates that warm data 255 and/or cold data 260 may be transferred to higher-density blocks if the transfer criteria are satisfied for the warm data 255 and/or the cold data 260.

The data flow diagram 300-b illustrates a host system 205 and a memory system 210 that includes a buffer 215 and higher-density blocks 220. The memory system 210 may determine whether one or more sets of criteria are satisfied for transferring the hot data 250, the warm data 255, and/or the cold data 260 to the higher density blocks 220. If any criteria are satisfied, the memory system 210 may transfer data at 315 from the buffer 215 to the higher-density blocks 220. The criteria for transferring the hot data 250 may be configured to be more stringent than the criteria for the warm data 255 and/or the cold data 260. Such circumstances may result in the hot data 250 being transferred from the buffer 215 to the higher-density blocks 220 less frequently than the warm data 255 and/or the cold data 260. Such circumstances may also increase a likelihood that the hot data 250 is invalidated while stored in the buffer 215 (rather than while being stored in the higher-density blocks 220), which may reduce the WA and TBW of the memory system 210. The criteria for transferring the warm data 255 may be configured to be more stringent than the criteria for the cold data 260. Such circumstances may result in the warm data 255 being transferred from the buffer 215 to the higher-density blocks 220 less frequently than the cold data 260. Such circumstances may also increase a likelihood that the warm data 255 is invalidated while stored in the buffer 215 (rather than while being stored in the higher-density blocks 220), which may reduce the WA and TBW of the memory system 210.

Additionally or alternatively, additional pages 230 of data stored in the buffer 215 may be invalidated by the host system 205, which may make even more space available. For example, page 320) may be invalidated by the host system 205, freeing up more space in the buffer 215 than what is freed by the transfer operation 315.

In some cases, the memory system 210 may determine whether data stored in the buffer 215 is valid as part of transferring data from the buffer 215 to the higher-density blocks 220. For example, if the memory system 210 is transferring data (e.g., hot data 250), warm data 255, cold data 260), the memory system 210 may determine whether data is valid or invalid before transferring. If the data is invalid, the memory system 210 may refrain from transferring the data. In some cases, the buffer 215 is managed in a way that the memory system 210 may not attempt to transfer pages that are available to store additional information, which may actually include invalid data (in some cases).

Additionally or alternatively, by grouping the hot data 250 in sequential blocks of the higher-density blocks 220, those blocks are more likely to experience a garbage collection operation in duration. Further, by grouping the hot data 250) in sequential blocks of the higher-density blocks 220, it may reduce the likelihood even further that the blocks that store warm data 255 and/or cold data 260 may experience a garbage collection in the duration.

Figure 4:
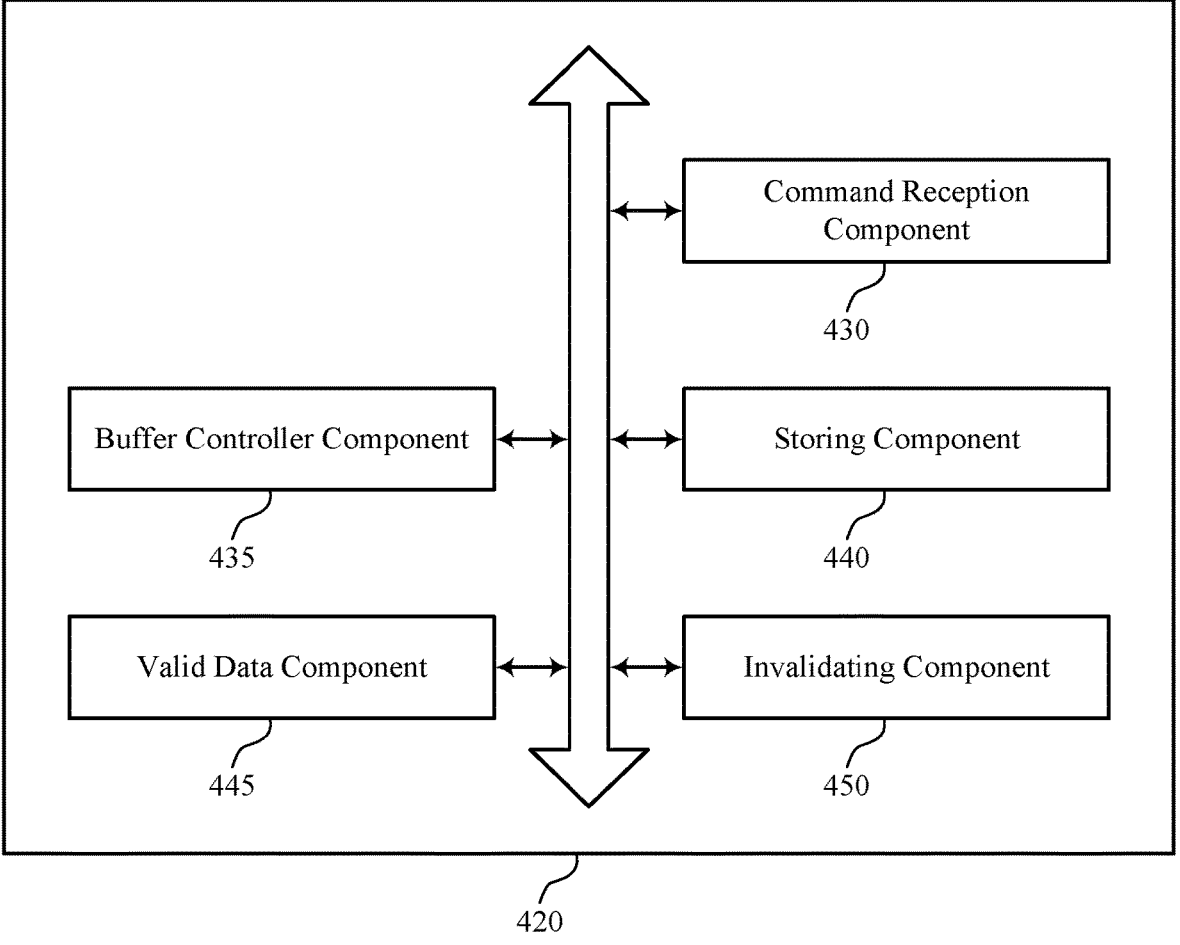
FIG. 4 illustrates a block diagram of a memory system that supports partitioned transferring for write booster in accordance with examples as disclosed herein.
Figure 4:

FIG. 4 illustrates a block diagram 400 of a memory system 420 that supports partitioned transferring for write booster in accordance with examples as disclosed herein. The memory system 420 may be an example of aspects of a memory system as described with reference to FIGS. 1 through 3. The memory system 420, or various components thereof, may be an example of means for performing various aspects of partitioned transferring for write booster as described herein. For example, the memory system 420 may include a command reception component 430, a buffer controller component 435, a storing component 440, a valid data component 445, an invalidating component 450, or any combination thereof. Each of these components may communicate, directly or indirectly, with one another (e.g., via one or more buses).

The command reception component 430 may be configured as or otherwise support a means for receiving a command to write data to the memory device, the command including an indication of a type of the data. The buffer controller component 435 may be configured as or otherwise support a means for writing the data to a buffer that includes a first plurality of blocks associated with storing information in a first type of memory cells based at least in part on the command. In some examples, the buffer controller component 435 may be configured as or otherwise support a means for determining whether a first type of data stored in the buffer satisfies a first criteria based at least in part on writing the data to the buffer, wherein the buffer is configured to store the first type of data and a second type of data. The storing component 440 may be configured as or otherwise support a means for writing a quantity of the first type of data to a first block of a second plurality of blocks associated with a second type of memory cells based at least in part on determining that the first type of data satisfies the first criteria.

In some examples, the valid data component 445 may be configured as or otherwise support a means for determining that a first subset of the first type of data stored in the buffer is valid and a second subset of the first type of data stored in the buffer is invalid, wherein writing the quantity of the first type of data to the first block of the second plurality of blocks further comprises writing the first subset of the first type of data without writing the second subset of the first type of data.

In some examples, the storing component 440 may be configured as or otherwise support a means for determining whether writing the quantity of the first type of data to the first block of the second plurality of blocks is successful. In some examples, the invalidating component 450 may be configured as or otherwise support a means for invalidating the quantity of the first type of data stored in the buffer based at least in part on determining that the write is successful.

In some examples, the buffer controller component 435 may be configured as or otherwise support a means for determining whether the second type of data stored in the buffer satisfies a second criteria. In some examples, the storing component 440 may be configured as or otherwise support a means for writing a second quantity of the second type of data stored in the buffer to a second block of the second plurality of blocks associated with the second type of memory cells based at least in part on determining that the second type of data satisfies the second criteria.

In some examples, determining whether the second type of data stored in the buffer satisfies the second criteria occurs after writing the quantity of the first type of data to the first block.

In some examples, the storing component 440 may be configured as or otherwise support a means for writing a second quantity of the second type of data to a second block of the second plurality of blocks associated with the second type of memory cells based at least in part on determining that the second type of data satisfies a second criteria different than the first criteria.

In some examples, the storing component 440 may be configured as or otherwise support a means for writing a second quantity of the second type of data to a third block associated with a third type of memory cells based at least in part on determining that the second type of data satisfies a second criteria different than the first criteria.

In some examples, the first criteria is associated with a percentage of valid data stored in the buffer, a percentage of valid data associated with the first type of data stored in the buffer, a percentage of valid data associated with the second type of data stored in the buffer, or any combination thereof.

In some examples, the command reception component 430 may be configured as or otherwise support a means for determining that the data is of the first type of data based at least in part on the indication of the type of the data in the command to write the data, where writing the data to the buffer is based at least in part on determining that the data is of the first type.

In some examples, the first type of memory cells includes a single level cell configured to store one bit of information and the second type of memory cells includes a triple level cell configured to store three bits of information or a quadruple level cell configured to store four bits of information.

In some examples, the first type of data is cold data and the second type of data is hot data, the hot data being invalidated at a faster rate than the cold data. In some examples, the indication includes a stream identifier associated with the data.

FIG. 5 illustrates a flowchart showing a method 500 that supports partitioned transferring for write booster in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving a command to write data to the memory device, the command including an indication of a type of the data. The operations of 505 may be performed in accordance with examples as disclosed herein. In some examples, aspects of the operations of 505 may be performed by a command reception component 430 as described with reference to FIG. 4.

At 510, the method may include writing the data to a buffer that includes a first plurality of blocks associated with storing information in a first type of memory cells based at least in part on the command. The operations of 510 may be performed in accordance with examples as disclosed herein. In some examples, aspects of the operations of 510 may be performed by a buffer controller component 435 as described with reference to FIG. 4.

At 515, the method may include determining whether a first type of data stored in the buffer satisfies a first criteria based at least in part on writing the data to the buffer, wherein the buffer is configured to store the first type of data and a second type of data. The operations of 515 may be performed in accordance with examples as disclosed herein. In some examples, aspects of the operations of 515 may be performed by a buffer controller component 435 as described with reference to FIG. 4.

At 520, the method may include writing a quantity of the first type of data to a first block of a second plurality of blocks associated with a second type of memory cells based at least in part on determining that the first type of data satisfies the first criteria. The operations of 520 may be performed in accordance with examples as disclosed herein. In some examples, aspects of the operations of 520 may be performed by a storing component 440 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a command to write data to the memory device, the command including an indication of a type of the data; writing the data to a buffer that includes a first plurality of blocks associated with storing information in a first type of memory cells based at least in part on the command; determining whether a first type of data stored in the buffer satisfies a first threshold based at least in part on writing the data to the buffer, where the buffer is configured to store the first type of data and a second type of data; and writing a quantity of the first type of data to a first block of a second plurality of blocks associated with a second type of memory cells based at least in part on determining that first type of data satisfies the first criteria.

Aspect 2: The method, apparatus, or non-transitory computer-readable medium of aspect 1, further including operations, features, circuitry, logic, means, or instructions, or any combination thereof for determining that a first subset of the first type of data stored in the buffer is valid and a second subset of the first type of data stored in the buffer is invalid, wherein writing the quantity of the first type of data to the first block of the second plurality of blocks further comprises writing the first subset of the first type of data without writing the second subset of the first type of data.

Aspect 3: The method, apparatus, or non-transitory computer-readable medium of any of aspects 1 through 2, further including operations, features, circuitry, logic, means, or instructions, or any combination thereof for determining whether writing the quantity of the first type of data to the first block of the second plurality of blocks is successful and invalidating the quantity of the first type of data stored in the buffer based at least in part on determining that the write is successful.

Aspect 4: The method, apparatus, or non-transitory computer-readable medium of any of aspects 1 through 3, further including operations, features, circuitry, logic, means, or instructions, or any combination thereof for determining whether the second type of data stored in the buffer satisfies a second criteria and writing a second quantity of the second type of data stored in the buffer to a second block of the second plurality of blocks associated with the second type of memory cells based at least in part on determining that the second type of data satisfies the second criteria.

Aspect 5: The method, apparatus, or non-transitory computer-readable medium of aspect 4, where determining whether the second type of data stored in the buffer satisfies the second criteria occurs after writing the quantity of the first type of data to the first block.

Aspect 6: The method, apparatus, or non-transitory computer-readable medium of any of aspects 1 through 5, further including operations, features, circuitry, logic, means, or instructions, or any combination thereof for writing a second quantity of the second type of data to a second block of the second plurality of blocks associated with the second type of memory cells based at least in part on determining that the second type of data satisfies a second criteria different than the first criteria.

Aspect 7: The method, apparatus, or non-transitory computer-readable medium of any of aspects 1 through 6, further including operations, features, circuitry, logic, means, or instructions, or any combination thereof for writing a second quantity of the second type of data to a third block associated with a third type of memory cells based at least in part on determining that the second type of data satisfies a second criteria different than the first criteria.

Aspect 8: The method, apparatus, or non-transitory computer-readable medium of any of aspects 1 through 7, where the first criteria is associated with a percentage of valid data stored in the buffer, a percentage of valid data associated with the first type of data stored in the buffer, a percentage of valid data associated with the second type of data stored in the buffer, or any combination thereof.

Aspect 9: The method, apparatus, or non-transitory computer-readable medium of any of aspects 1 through 8, further including operations, features, circuitry, logic, means, or instructions, or any combination thereof for determining that the data is of the first type of data based at least in part on the indication of the type of the data in the command to write the data, where writing the data to the buffer is based at least in part on determining that the data is of the first type.

Aspect 10: The method, apparatus, or non-transitory computer-readable medium of any of aspects 1 through 9, where the first type of memory cells includes a single level cell configured to store one bit of information and the second type of memory cells includes a triple level cell configured to store three bits of information or a quadruple level cell configured to store four bits of information.

Aspect 11: The method, apparatus, or non-transitory computer-readable medium of any of aspects 1 through 10, where the first type of data is cold data and the second type of data is hot data, the hot data being invalidated at a faster rate than the cold data.

Aspect 12: The method, apparatus, or non-transitory computer-readable medium of any of aspects 1 through 11, where the indication includes a stream identifier associated with the data.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
a memory device; and
a controller coupled with the memory device and configured to cause the apparatus to:
    receive, from a host system, a command to write data to the memory device, the command comprising an indication of a type of the data;
    write the data to a write booster buffer that includes a first plurality of blocks associated with storing information in a first type of memory cells based at least in part on the command and based at least in part on the memory device operating in a write booster mode;
    determine whether a first type of data stored in the write booster buffer satisfies a first criteria based at least in part on writing the data to the write booster buffer, wherein the write booster buffer is configured to store the first type of data and a second type of data;
    determine that a first subset of the first type of data stored in the write booster buffer is valid and a second subset of the first type of data stored in the write booster buffer is invalid;
    write the first subset of the first type of data to a first block of a second plurality of blocks associated with a second type of memory cells without writing the second subset of the first type of data based at least in part on determining that the first type of data satisfies the first criteria, wherein the first criteria comprises the memory device being in an idle state, a queue of commands received from the host system being below a threshold, or both; and
    write a quantity of the second type of data to a third block associated with a third type of memory cells based at least in part on determining that the second type of data satisfies a second criteria different than the first criteria, wherein the first block is operable to store more data than the third block in accordance with the first block being associated with the second type of memory cells and the third block being associated with the third type of memory cells.

2. The apparatus of claim 1, wherein the controller is further configured to cause the apparatus to:
determine whether writing the first subset of the first type of data to the first block of the second plurality of blocks is successful; and
invalidate the second subset of the first type of data stored in the write booster buffer based at least in part on determining that writing the first subset of the first type of data to the first block of the second plurality of blocks is successful.

3. The apparatus of claim 1, wherein the controller is further configured to cause the apparatus to:
determine whether the second type of data stored in the write booster buffer satisfies a third criteria; and
write a quantity of the second type of data stored in the write booster buffer to a second block of the second plurality of blocks associated with the second type of memory cells based at least in part on determining that the second type of data satisfies the third criteria.

4. The apparatus of claim 3, wherein determining whether the second type of data stored in the write booster buffer satisfies the third criteria occurs after writing the first subset of the first type of data to the first block.

5. The apparatus of claim 1, wherein the controller is further configured to cause the apparatus to:

write a quantity of the second type of data to a second block of the second plurality of blocks associated with the second type of memory cells based at least in part on determining that the second type of data satisfies a third criteria different than the first criteria.

6. The apparatus of claim 1, wherein the first criteria is associated with a percentage of valid data stored in the write booster buffer, a percentage of valid data associated with the first type of data stored in the write booster buffer, a percentage of valid data associated with the second type of data stored in the write booster buffer, or any combination thereof.

7. The apparatus of claim 1, wherein the controller is further configured to cause the apparatus to:

determine that the data is of the first type of data based at least in part on the indication of the type of the data in the command to write the data, wherein writing the data to the write booster buffer is based at least in part on determining that the data is of the first type.

8. The apparatus of claim 1, wherein the first type of memory cells comprises a single level cell configured to store one bit of information, the second type of memory cells comprises a triple level cell configured to store three bits of information or a quadruple level cell configured to store four bits of information, and the third type of memory cells comprises a multi-level cell configured to store two bits of information or the triple level cell configured to store three bits of information.

9. The apparatus of claim 1, wherein the first type of data is cold data and the second type of data is hot data, the hot data being invalidated at a faster rate than the cold data.

10. The apparatus of claim 1, wherein the indication comprises a stream identifier associated with the data.

11. A non-transitory computer-readable medium storing code comprising instructions which, when executed by a processor of an electronic device, cause the electronic device to:

receive, from a host system, a command to write data to a memory device, the command comprising an indication of a type of the data;

write the data to a write booster buffer that includes a first plurality of blocks associated with storing information in a first type of memory cells based at least in part on the command and based at least in part on the memory device operating in a write booster mode;

determine whether a first type of data stored in the write booster buffer satisfies a first criteria based at least in part on writing the data to the write booster buffer, wherein the write booster buffer is configured to store the first type of data and a second type of data;

determine that a first subset of the first type of data stored in the write booster buffer is valid and a second subset of the first type of data stored in the write booster buffer is invalid;

write the first subset of the first type of data to a first block of a second plurality of blocks associated with a second type of memory cells without writing the second subset of the first type of data based at least in part on determining that the first type of data satisfies the first criteria, wherein the first criteria comprises the memory device being in an idle state, a queue of commands received from the host system being below a threshold, or both; and write a quantity of the second type of data to a third block associated with a third type of memory cells based at least in part on determining that the second type of data satisfies a second criteria different than the first criteria, wherein the first block is operable to store more data than the third block in accordance with the first block being associated with the second type of memory cells and the third block being associated with the third type of memory cells.

12. The non-transitory computer-readable medium of claim 11, wherein the instructions, when executed by the processor of the electronic device, further cause the electronic device to:

determine whether writing the first subset of the first type of data to the first block of the second plurality of blocks is successful; and invalidate the first subset of the first type of data stored in the write booster buffer based at least in part on determining that writing the first subset of the first type of data to the first block of the second plurality of blocks is successful.

13. The non-transitory computer-readable medium of claim 11, wherein the instructions, when executed by the processor of the electronic device, further cause the electronic device to:

determine whether the second type of data stored in the write booster buffer satisfies a third criteria; and write a quantity of the second type of data stored in the write booster buffer to a second block of the second plurality of blocks associated with the second type of memory cells based at least in part on determining that the second type of data satisfies the third criteria.

14. The non-transitory computer-readable medium of claim 13, wherein determining whether the second type of data stored in the write booster buffer satisfies the third criteria occurs after writing the first subset of the first type of data to the first block.

15. The non-transitory computer-readable medium of claim 11, wherein the instructions, when executed by the processor of the electronic device, further cause the electronic device to:

write a quantity of the second type of data to a second block of the second plurality of blocks associated with the second type of memory cells based at least in part on determining that the second type of data satisfies a third criteria different than the first criteria.

16. A method, comprising:

receiving, from a host system, a command to write data to a memory device, the command comprising an indication of a type of the data;

writing the data to a write booster buffer that includes a first plurality of blocks associated with storing information in a first type of memory cells based at least in part on the command and based at least in part on the memory device operating in a write booster mode;

determining whether a first type of data stored in the write booster buffer satisfies a first criteria based at least in part on writing the data to the write booster buffer, wherein the write booster buffer is configured to store the first type of data and a second type of data;

determining that a first subset of the first type of data stored in the write booster buffer is valid and a second subset of the first type of data stored in the write booster buffer is invalid;

writing the first subset of the first type of data to a first block of a second plurality of blocks associated with a second type of memory cells without writing the second subset of the first type of data based at least in part on determining that the first type of data satisfies the 5 first criteria, wherein the first criteria comprises the memory device being in an idle state, a queue of commands received from the host system being below a threshold, or both; and writing a quantity of the second type of data to a third 10 block associated with a third type of memory cells based at least in part on determining that the second type of data satisfies a second criteria different than the first criteria, wherein the first block is operable to store more data than the third block in accordance with the 15 first block being associated with the second type of memory cells and the third block being associated with the third type of memory cells.

\* \* \* \* \*